US011986930B2

(12) United States Patent
Li et al.

(10) Patent No.: US 11,986,930 B2
(45) Date of Patent: May 21, 2024

(54) HIGH-TORQUE IMPACT WRENCH

(71) Applicants: Xiaorong Li, Zhejiang (CN); Fazheng Yang, Zhejiang (CN)

(72) Inventors: Xiaorong Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 472 days.

(21) Appl. No.: 17/412,240

(22) Filed: Aug. 25, 2021

(65) Prior Publication Data

US 2023/0072316 A1 Mar. 9, 2023

(51) Int. Cl.
*B25B 21/02* (2006.01)

(52) U.S. Cl.
CPC .................................... *B25B 21/02* (2013.01)

(58) Field of Classification Search
CPC ....... B25B 19/00; B25B 21/00; B25B 21/008; B25B 21/023; B25B 21/026; B25B 21/02
See application file for complete search history.

(56) References Cited

U.S. PATENT DOCUMENTS

| | | | | |
|---|---|---|---|---|
| 11,626,820 B2 * | 4/2023 | Ni | B25B 21/02 | 81/464 |
| 2021/0237253 A1 * | 8/2021 | Moss | B25F 5/029 | |
| 2023/0072316 A1 * | 3/2023 | Li | B25B 21/026 | |
| 2023/0148339 A1 * | 5/2023 | Fortoloczki | B25B 23/1425 | 81/469 |
| 2023/0164550 A1 * | 5/2023 | Davis | G06F 21/35 | 726/7 |
| 2023/0234203 A1 * | 7/2023 | Sasaki | G06V 20/50 | 173/21 |
| 2023/0234206 A1 * | 7/2023 | Yamanaka | B25B 23/147 | 173/46 |

* cited by examiner

*Primary Examiner* — Lee D Wilson

(57) ABSTRACT

A high-torque impact wrench is disclosed. The impact wrench comprises a case. The case comprises an engine body and a handhold. A base is provided on the bottom of the handhold. A battery pack is provided inside the base. The rear end of the engine body is configured with a motor, and the front end of the engine body is configured with an output shaft. The front end of the output shaft extends out of the engine body. A spindle is configured between the motor and the output shaft. The rear end of the spindle is provided with a spindle seat. The spindle is sheathed by an impact block. The spindle outer wall is configured with a steel ball track. Inside the steel ball track, there are steel balls matching the impact block.

7 Claims, 2 Drawing Sheets

HIGH-TORQUE IMPACT WRENCH

BACKGROUND OF INVENTION

1. Field of the Invention

The present invention relates generally to an impact wrench, and more particularly to a high-torque impact wrench which.

2. Description of Related Art

An impact wrench is an electricity-powered wrench with a hammering mechanism that turns in the tangential direction. When using an impact wrench, the users can hold the handhold of the impact wrench. After the impact wrench is started, the motor inside the impact wrench engine body starts to work. The motor shaft directly drives the spindle to rotate, and the spindle in turn will drive the output shaft to rotate. When the spindle revolves, through the movement of the balls inside the steel ball track on the outer wall of the spindle, the impact block will be driven to move in the axial direction. Along with the movement of the impact block, the impact sprint between the rear end surface of the impact block and the front side wall of the spindle seat on the rear end of the spindle will be compressed. The impact spring generates an elastic force to act upon the impact block. In turn, the impact block will exert a pressure on the output shaft, so that the output shaft has a pressure while turning. Therefore, the transverse length of the impact wrench engine body will be affected by the length of motor, the length of spindle, the impact length and the length of the output shaft. When the length of the components cannot be reduced, the distance from the front end surface of the output shaft of the impact wrench to the outer wall at the rear end of the engine body of the impact wrench will be very large. As a result, the impact wrench will have a very large transverse length. However, impact wrenches are frequently used in narrow places like the wall corners. If the transverse length of the impact wrench is too long, the impact wrench can not be used conveniently in the narrow space of a wall corner. The will greatly affect the work efficiency. In some cases, operation may simply become impossible.

The torque of an impact wrench is mainly related to the motor power, the mass of the impact mechanism and the pressure of the impact spring. When the motor power and the mass of the impact mechanism is constant, the pressure of the impact spring will become a critical factor. However, the pressure of the impact spring is determined by the degree of compression of the sprint itself. The front end and rear end of the impact spring are respectively pressed against the rear end surface of the impact block and the side wall on the front side of the spindle seat. Therefore, when the impact spring is compressed, the front end and rear end of the impact spring will generate frictional forces. Meanwhile, when the impact block moves along with the spindle, the impact block itself is also in a revolving state, with the rotational speed of the impact block being much less than the rotational speed of the spindle. When the front end and rear end of the impact spring are both subject to frictional forces, the compressed impact spring cannot maintain stable compression in the axial direction. It may be twisted. Consequently, the pressure of the impact spring will be diminished, and the elastic force generated by the compressed impact spring will be affected, leading to reduced torque of the impact wrench.

SUMMARY OF THE INVENTION

The invention provides a high-torque impact wrench, which can not only effectively shorten the lateral length of the impact wrench, enable it to be easily constructed at the corner of the wall, but also can effectively ensure the torque of the impact wrench and realize the effect of large torque.

The technical solutions adopted by the present invention to solve the above technical problems are:

A high-torque impact wrench, comprising a case, an engine body and a handhold disposed in the case, a base disposed at a bottom of the handhold, a battery pack disposed in an inside of the base, a motor disposed at a rear end of the engine body, an output shaft disposed at a front end of the engine body, and a front end of the output shaft extending out of the engine body, a spindle disposed between the motor and the output shaft, a spindle seat disposed at a rear end of the spindle, an impact block disposed outside the spindle, a steel ball track disposed at outer wall of the spindle, a steel ball, which is matching the impact block, disposed inside the steel ball track, the motor shaft of the motor being connected to the spindle through an impact mechanism; a ring-shaped hidden trough disposed at a rear end of the impact block includes; a ring-shaped ball slideway disposed at a bottom of the hidden trough has; a plurality of balls evenly distributed on the circumference of the ball slideway; a ring-shaped swivel plate disposed at the bottom of the hidden trough has; a front sidewall of the swivel plate be attached to a rear end of the ball; a movement gap disposed between an inner wall of the swivel plate and an inner wall of the hidden trough; an impact spring disposed in the hidden trough; wherein an front end of the impact spring is pressed against a rear side wall of the swivel plate, a rear end of the impact spring extends backward to an outside of the hidden trough and is pressed against a front side wall of the spindle seat.

More particularly, wherein the ratio between the distance from the front end surface of the output shaft to the outer wall on the rear end of the engine body and the torque output by the output shaft is lower than or equal to 0.56.

More particularly, wherein the impact mechanism comprises a center gear configured on the front end of the motor shaft; the side wall on the rear side of the spindle seat is configured with a plurality of pinholes distributed evenly along a circle; the inside of the pinhole is configured with a matching gear pin; the rear end of the gear pin extends backward and out of the pinhole, and is configured with free gears that mesh with the center gear; the spindle seat is sheathed by an inner gear ring that is fixed on the inner wall of the engine body, the inner wall of the inner gear ring is configured with a plurality of evenly distributed inner teeth; the inner gear ring encloses the free gears inside, and the inner teeth mesh with the free gears.

More particularly, wherein the peripheral surface of the inner gear ring is configured with a plurality of limiting blocks evenly distributed along a circle; the inner wall of the engine body is configured with a plurality of limiting slots matching the limiting block.

More particularly, wherein the number of the free gears is 3.

More particularly, wherein the front end of the engine body is configured with an output hole that is communicated to its internal space, the front end of the output shaft goes through the output hole to extend out of the engine body; the inside of the front end of the engine body is configured with a ring-shaped sealed stage; the rear side of the sealed stage is configured with a limiting stage; the rear end of the output shaft is configured with a limiting portion matching the limiting stage; the output shaft is sheathed by a guide sleeve matching the sealed stage; the outer wall of the output shaft is configured with a ring-shaped external caulking groove, the inner wall of the guide sleeve is configured with a ring-shaped internal caulking groove, the internal caulking groove is opposite to the external caulking groove; the inside of the external caulking groove is configured with a matching sleeve bushing, and the outer side of the sleeve bushing is embedded into the internal caulking groove.

More particularly, wherein the inner wall of the right end of the guide sleeve is configured with a ring-shaped sealing groove; the inside of the sealing groove is configured with a matching oil seal; the inner wall of the oil seal is configured with a ring-shaped sealing portion, the sealing portion is narrow on the front side and wide on the back side, and the sealing portion is integrally formed with the oil seal; the rear end of the sealing portion is pressed against the outer wall of the output shaft.

The present invention provides a high-torque impact wrench, which can effectively reduce the transverse length of the impact wrench, so that it can be conveniently used in narrow places like wall corners. Meanwhile, it can effectively ensure a high torque of the impact wrench.

The present invention provides the following efficacy:

During operation of the high-torque impact wrench disclosed in the invention, when the spindle seat rotates, through the frictional force between its front side wall and the rear end of the impact spring, the spindle will drive the impact spring to rotate. The front end of the impact spring is pressed against the swivel plate. When the impact spring rotates, the swivel plate will rotate under the frictional force. The front side wall of the swivel plate is in contact with the rear end of the ball. When the swivel plate turns, the balls will roll along the ball slideway. The rolling of the balls can effectively reduce the resistance during the rotation of the swivel plate, so that the swivel plate can have a rotational speed equal to the rotational speed of the spindle seat. Thus, it can effectively solve the problem that the impact spring cannot be compressed in the axial direction and will be twisted due to inconsistent rotational speeds of the spindle and the impact block, and the impact spring can be compressed stably along the movement of the impact block to generate a strong elastic pressure, which will consequently ensure a high torque on the output shaft.

In the present invention, the rear end surface of the impact block is configured with a ring-shaped hidden trough. The majority of the impact spring is directly hidden inside the hidden trough. Even though the length of the sprint itself is not changed, the distance between the spindle seat, the impact spring and the impact block will be considerably reduced, so that the transverse length of the engine body can be effectively reduced. When the transverse length of the engine body is reduced, the impact wrench can be used conveniently in the narrow space of a wall corner during the engineering work, and the work efficiency can be enhanced.

DETAILED DESCRIPTION OF THE INVENTION

Figure 1:
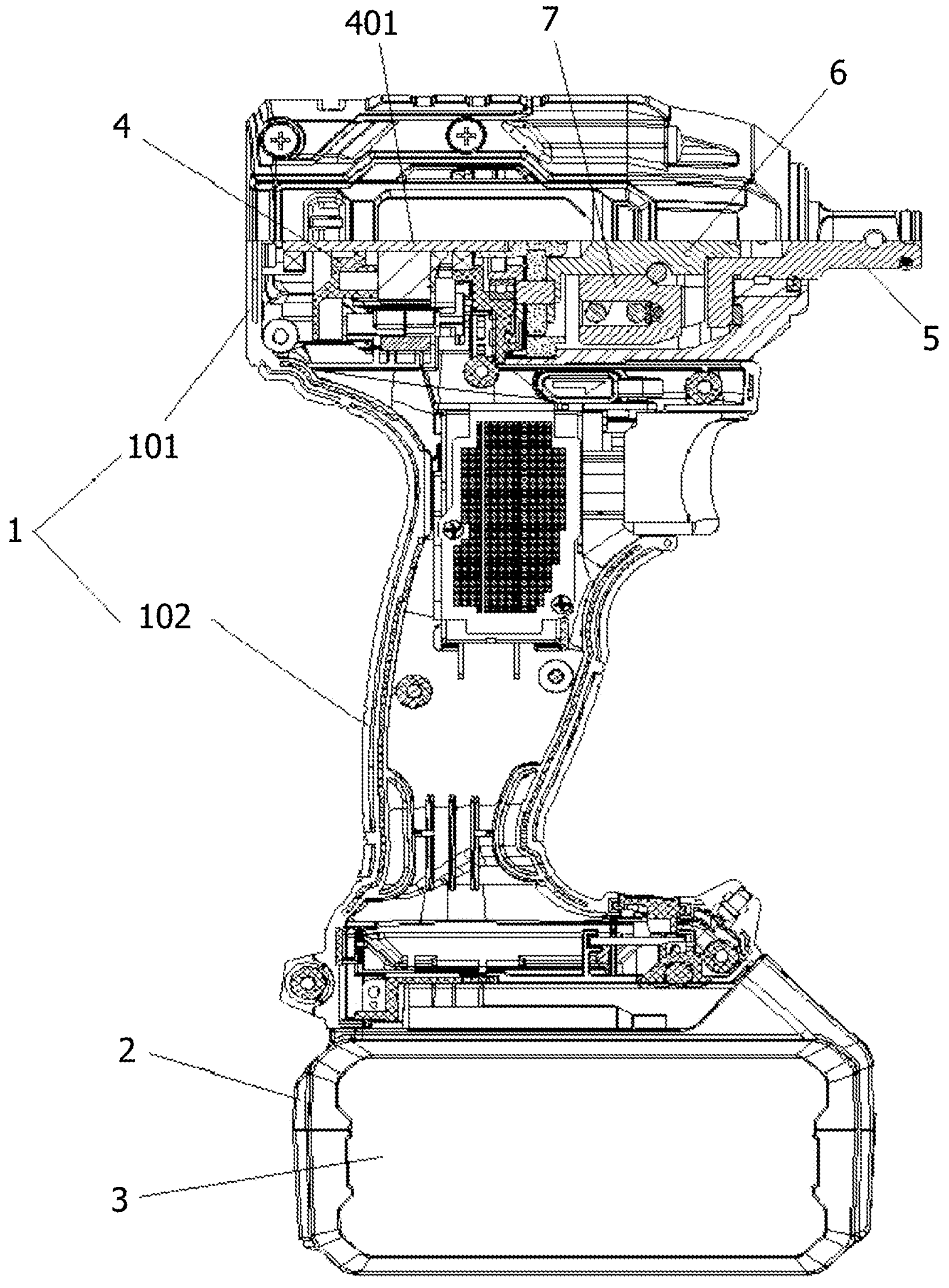
FIG. 1 is a structural perspective of the high-torque impact wrench according to the invention.
Figure 2:
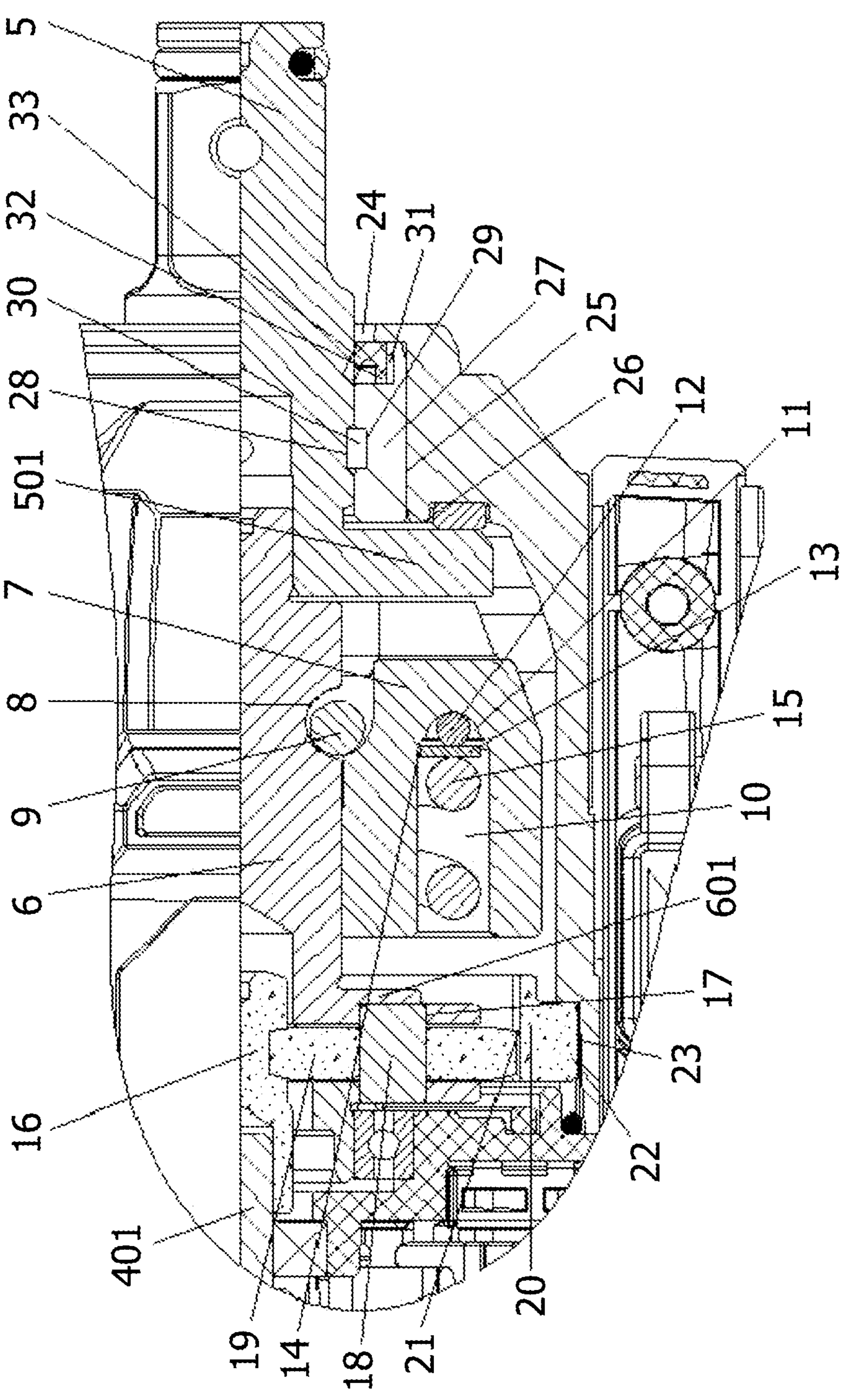
FIG. 2 is partial structural perspective of the high-torque impact wrench according to the invention.

Further detailed descriptions of the invention are provided below with reference to the accompanying figures and with respect to a preferred embodiment:

Referring to FIG. 1 and FIG. 2, the invention provides a high-torque impact wrench comprising a case 1. The case 1 comprises an engine body 101 and a handhold 102. The bottom of the handhold 102 is configured with a base 2. The inside of the base 2 is configured with a battery pack 3. The rear end of the engine body 101 is configured with a motor 4. The front end of the engine body 101 is configured with an output shaft 5. The front end of the output shaft 5 extends out of the engine body 101. A spindle 6 is configured between the motor 4 and the output shaft 5. The rear end of the spindle 6 is configured with a spindle seat 601. The outside of the spindle 6 is sheathed by an impact block 7. The outer wall of the spindle 6 is configured with a steel ball track 8. The inside of the steel ball track 8 is configured with steel balls 9 that match the impact block 7. The motor shaft 401 of the motor 4 is connected to the spindle 6 through an impact mechanism. The rear end surface of the impact block 7 is configured with a ring-shaped hidden trough 10. The bottom of the hidden trough 10 is configured with a ring-shaped ball slideway 11. The inside of the ball slideway 11 is configured with balls 12 evenly distributed along a circle. The bottom of the hidden trough 10 is configured with a ring-shaped swivel plate 13. The front side wall of the swivel plate 13 is in contact with the rear end of the ball 12. There is a movement gap 14 between the inner wall of the swivel plate 13 and the wall on the inner side of the hidden trough 10. The inside of the hidden trough 10 is configured with a matching impact spring 15. The front end of the impact spring 15 is pressed against the rear side wall of the swivel plate 13. The rear end of the impact spring 15 extends backward out of the hidden trough 10 and is pressed against the front side wall of the spindle seat 601.

The ratio between the distance from the front end surface of the output shaft 5 to the outer wall of the rear end of the engine body 101 and the output torque of the output shaft 5 is lower than or equal to 0.56.

The impact mechanism comprises a center gear 16 configured on the front end of the motor shaft 401 of the motor 4. The rear side wall of the spindle seat 601 is configured with a plurality of pinholes 17 evenly distributed along a circle. The inside of the pinhole 17 is configured with a matching gear pin 18. The rear end of the gear pin 18 extends backward out of the pinhole 17, and is configured with free gears 19 that mesh with the center gear 16. The outside of the spindle seat 601 is sheathed by an inner gear ring 20 that is fixed on the inner wall of the engine body 101. The inner wall of the inner gear ring 20 is configured with a plurality of evenly distributed inner teeth 21. The inner gear ring 20 encloses the free gears 19, and the inner teeth 21 mesh with the free gears 19.

The external periphery of the inner gear ring 20 is configured with a plurality of limiting blocks 22 that are distributed evenly along a circle. The inner wall of the engine body 101 is configured with a plurality of limiting slots 23 matching the limiting block 22.

The number of the free gears 19 is 3.

The front end of the engine body 101 is configured with an output hole 24 that is communicated to its internal space. The front end of the output shaft 5 goes through the output hole 24 and extends out of the engine body 101. The inside of the front end of the engine body 101 is configured with a ring-shaped sealed stage 25. The rear side of the sealed stage 25 is configured with a limiting stage 26. The rear end of the output shaft 5 is configured with a limiting portion 501 matching the limiting stage 26. The outside of the output shaft 5 is sheathed by a guide sleeve 27 matching the sealed stage 25. The outer wall of the output shaft 5 is configured with a ring-shaped external caulking groove 28. The inner wall of the guide sleeve 27 is configured with a ring-shaped internal caulking groove 29. The internal caulking groove 29 is opposite to the external caulking groove 28. The inside of the external caulking groove 28 is configured with a matching sleeve bushing 30. The external portion of the sleeve bushing 30 is embedded into the internal caulking groove 29.

The inner wall of the right end of the guide sleeve 27 is configured with a ring-shaped sealing groove 31. The inside of the sealing groove 31 is configured with a matching oil seal 32. The inner wall of the oil seal 32 is configured with a ring-shaped sealing portion 33. The sealing portion 33 is narrow on the front side and wide on the back side. The sealing portion 33 is integrally formed with the oil seal 32. The rear end of the sealing portion 33 is pressed upon the outer wall of the output shaft 5.

The operation of the present invention is described below:

When the motor 4 is started, the motor shaft 401 of the motor 4 will drive the center gear 16 to rotate. As the center gear 16 is meshed with the free gears 19, along with the rotation of the center gear 16, the free gears 19 will rotate. Meanwhile, the free gears 19 are meshed with the inner teeth 21 of the inner gear ring 20. The inner gear ring 20 is fixed inside the engine body 101 through the combination between the limiting block 22 and the limiting slot 23. When inner gear ring 20 is fixed steadily, the free gears 19 will move along the circular track of the inner gear ring 20, so as to realize rotation of the spindle seat 601. The existence of the free gears 19 can effectively distribute the load and enhance the output torque. When the spindle seat 601 rotates, the spindle 6 will rotate. When the spindle 6 rotates, the output shaft 5 will be driven to rotate. Through the balls 9 inside the steel ball track 8, the spindle 6 will cause the impact block 7 to move. When the impact block 7 moves, the impact block 7 compresses the impact spring 15. And the impact spring 15 will generate a pressure, so that the output shaft 5 will exert a force while turning.

When the spindle seat 601 rotates, through the frictional force between its front side wall and the rear end of the impact spring 15, the spindle seat 601 will drive the impact spring 15 to rotate. As the front end of the impact spring 15 is pressed against the swivel plate 13, when the impact spring 15 turns, the swivel plate 13 will also turn under the action of the frictional force. The front side wall of the swivel plate 13 is in contact with the rear end of the ball 12. When the swivel plate 13 turns, the ball 12 will roll along the ball slideway 11. The rolling of the balls 12 can effectively reduce the resistance during the rotation of the swivel plate 13, and therefore enables the swivel plate 13 to have a rotational speed equal to the rotational speed of the spindle seat 601. This can effectively avoid the problem that the impact spring 15 cannot be compressed in the axial direction and become twisted when the rotational speed of the spindle 6 is different from that of the impact block 7. Along with the movement of the impact block 7, the impact spring 15 can be compressed stably to generate sufficient elastic force, and consequently ensuring a high torque on the output shaft 5.

The rear end surface of the impact block 7 is configured with a ring-shaped hidden trough 10. Most of the impact spring 15 is directly hidden inside the hidden trough 10. Although the length of the impact spring 15 itself is not changed, the distances between the spindle seat 601, the impact spring 15, and the impact block 7 are considerably reduced. Thus, the transverse length of the engine body 101 can be effectively reduced. When the transverse length the engine body 101 is reduced, the impact wrench can be conveniently used in a narrow space like a wall corner. The engineering work can be carried smoothly and the work efficiency is enhanced.

When the ratio between the distance from the front end surface of the output shaft 5 to the outer wall of the rear end of the engine body 101 and the torque of the output shaft 5 is less than or equal to 0.56, a high torque can be maintained while the transverse length of the engine body 101 is reduced, thus maintaining good performance of the impact wrench.

The outside of the output shaft 5 is sheathed with a guide sleeve 27 matching the sealed stage. The outer wall of the output shaft 5 is configured with a ring-shaped external caulking groove 28. The inner wall of the guide sleeve 27 is configured with a ring-shaped internal caulking groove 29. The internal caulking groove 29 is opposite to the external caulking groove 28. The inside of the external caulking groove 28 is configured with a matching sleeve bushing 30. The external side of the sleeve bushing 30 is embedded into the internal caulking groove 29. The existence of the guide sleeve 27 and sleeve bushing 30 can effectively avoid eccentricity during the output of the output shaft 5, and can effectively ensure the stability during the output of the output shaft 5.

The inner wall of the rear end of the guide sleeve 27 is configured with a ring-shaped sealing groove 31. The inside of the sealing groove 31 is configured with a matching oil seal 32. The inner wall of the oil seal 32 is configured with a ring-shaped sealing portion 33. The sealing portion 33 is narrow on the front side and wide on the back side. The sealing portion 33 and the oil seal 32 is formed integrally. The rear end of the sealing portion 33 is pressed upon the outer wall of the output shaft. When the lubrication grease leaks outward, the lubrication grease will go into the gap between the inner wall of the rear end of the oil seal 32 and the outer wall on the rear end of the sealing portion 33, and enter the space between the inner wall of the oil seal 32 and the outer wall of the sealing portion 33. As more and more sealing grease continuously enters this space, the pressure in this space will increase. Under the pressure, the oil seal 32 will deform outward, while the sealing portion 33 will deform inward. The sealing portion 33 will be further pressed against the outer wall of the output shaft 5 to ensure maximum sealing effect.

We claim:

1. A high-torque impact wrench, comprising a case, an engine body and a handhold disposed in the case, a base disposed at a bottom of the handhold, a battery pack disposed in an inside of the base, a motor disposed at a rear end of the engine body, an output shaft disposed at a front end of the engine body, and a front end of the output shaft extending out of the engine body, a spindle disposed between the motor and the output shaft, a spindle seat disposed at a rear end of the spindle, an impact block disposed outside the spindle, a steel ball track disposed at outer wall of the spindle, a steel ball, which is matching the impact block, disposed inside the steel ball track, the motor shaft of the motor being connected to the spindle through an impact mechanism;

a ring-shaped hidden trough disposed at a rear end of the impact block includes;

a ring-shaped ball slideway disposed at a bottom of the hidden trough has;

a plurality of balls evenly distributed on the circumference of the ball slideway;

a ring-shaped swivel plate disposed at the bottom of the hidden trough has; a front sidewall of the swivel plate be attached to a rear end of the ball;

a movement gap disposed between an inner wall of the swivel plate and an inner wall of the hidden trough;

an impact spring disposed in the hidden trough; wherein an front end of the impact spring is pressed against a rear side wall of the swivel plate, a rear end of the impact spring extends backward to an outside of the hidden trough and is pressed against a front side wall of the spindle seat.

2. The high-torque impact wrench defined in claim 1, wherein the ratio between the distance from the front end surface of the output shaft to the outer wall on the rear end of the engine body and the torque output by the output shaft is lower than or equal to 0.56.

3. The high-torque impact wrench defined in claim 1, wherein the impact mechanism comprises a center gear configured on the front end of the motor shaft; the side wall on the rear side of the spindle seat is configured with a plurality of pinholes distributed evenly along a circle; the inside of the pinhole is configured with a matching gear pin; the rear end of the gear pin extends backward and out of the pinhole, and is configured with free gears that mesh with the center gear; the spindle seat is sheathed by an inner gear ring that is fixed on the inner wall of the engine body, the inner wall of the inner gear ring is configured with a plurality of evenly distributed inner teeth; the inner gear ring encloses the free gears inside, and the inner teeth mesh with the free gears.

4. The high-torque impact wrench defined in claim 3, wherein the peripheral surface of the inner gear ring is configured with a plurality of limiting blocks evenly distributed along a circle; the inner wall of the engine body is configured with a plurality of limiting slots matching the limiting block.

5. The high-torque impact wrench defined in claim 3, wherein the number of the free gears is 3.

6. The high-torque impact wrench defined in claim 1, wherein the front end of the engine body is configured with an output hole that is communicated to its internal space, the front end of the output shaft goes through the output hole to extend out of the engine body; the inside of the front end of the engine body is configured with a ring-shaped sealed stage; the rear side of the sealed stage is configured with a limiting stage; the rear end of the output shaft is configured with a limiting portion matching the limiting stage; the output shaft is sheathed by a guide sleeve matching the sealed stage; the outer wall of the output shaft is configured with a ring-shaped external caulking groove, the inner wall of the guide sleeve is configured with a ring-shaped internal caulking groove, the internal caulking groove is opposite to the external caulking groove; the inside of the external caulking groove is configured with a matching sleeve bushing, and the outer side of the sleeve bushing is embedded into the internal caulking groove.

7. The high-torque impact wrench defined in claim 1, wherein the inner wall of the right end of the guide sleeve is configured with a ring-shaped sealing groove; the inside of the sealing groove is configured with a matching oil seal; the inner wall of the oil seal is configured with a ring-shaped sealing portion, the sealing portion is narrow on the front side and wide on the back side, and the sealing portion is integrally formed with the oil seal; the rear end of the sealing portion is pressed against the outer wall of the output shaft.

* * * * *